No. 755,510. Patented March 22, 1904.

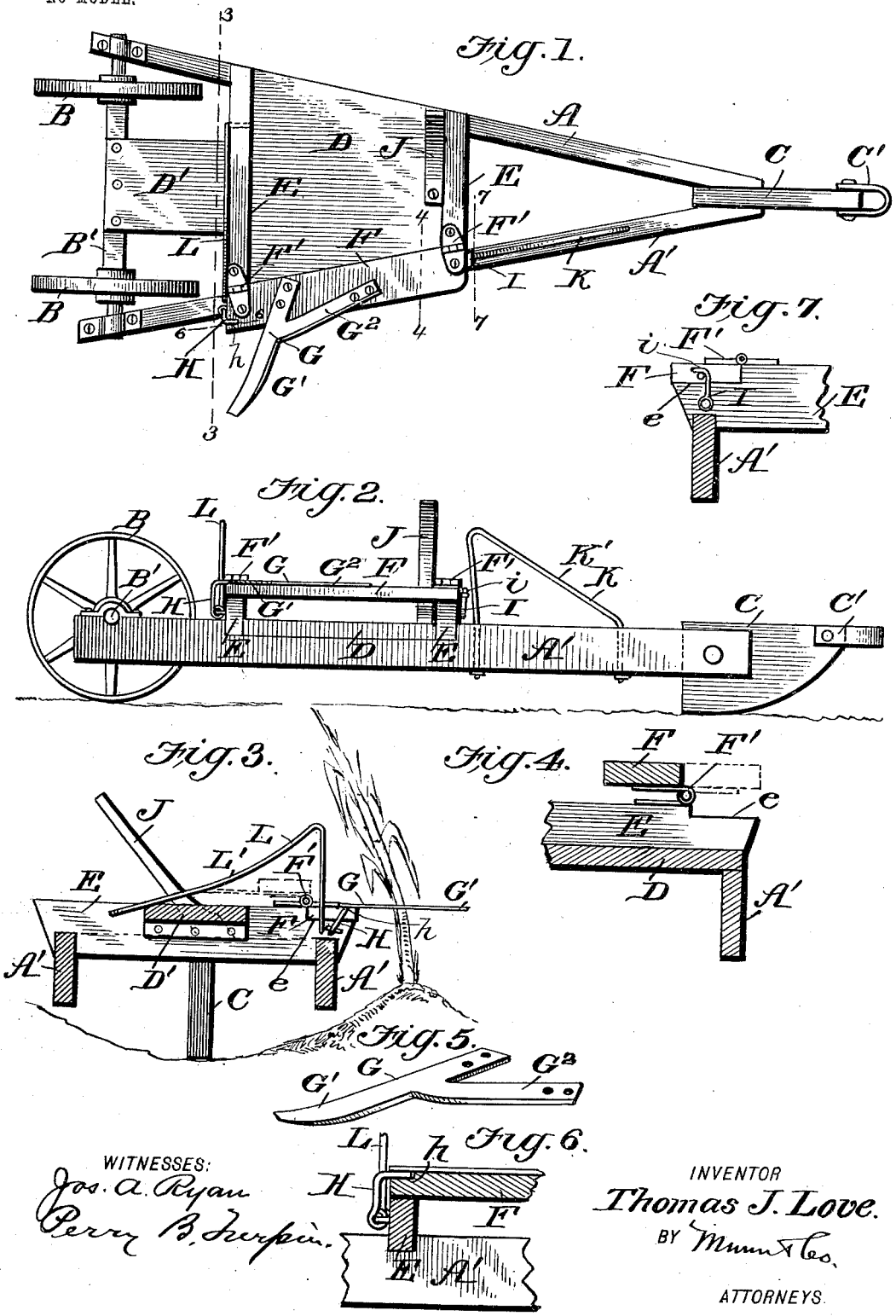

UNITED STATES PATENT OFFICE.

THOMAS J. LOVE, OF LINCOLN, ILLINOIS.

CORN-CUTTER.

SPECIFICATION forming part of Letters Patent No. 755,510, dated March 22, 1904.

Application filed October 30, 1903. Serial No. 179,120. (No model.)

*To all whom it may concern:*

Be it known that I, THOMAS J. LOVE, a citizen of the United States, and a resident of Lincoln, in the county of Logan and State of Illinois, have made certain new and useful Improvements in Corn-Cutters, of which the following is a specification.

My invention is an improvement in corn-cutters, having for an object to provide a novel construction adapted to operate between two standing rows of corn and provided with means for cutting the corn, for holding the corn as it is cut, and constructed to admit the adjustment of the cutting devices out of position for use when it is desired to pass by the shock of corn without cutting the gallas-hill, by which is meant the four hills of corn which are not cut, but are tied together to set the shock against; and the invention consists in certain novel constructions and combinations of parts, as will be hereinafter described and claimed.

In the drawings, Figure 1 is a top plan view, and Fig. 2 is a side elevation, of a corn-cutter embodying my invention. Fig. 3 is a cross-sectional view on about line 3 3 of Fig. 1. Fig. 4 is a detail cross-section on about line 4 4 of Fig. 1. Fig. 5 is a detail perspective view of the cutter-blade. Fig. 6 is a detail section on about line 6 6 of Fig. 1, illustrating the hook for securing the rear end of the swinging carrier for the cutter; and Fig. 7 is a detail section on about line 7 7 of Fig. 1, illustrating the hook for securing the front end of such carrier.

The machine as shown is pointed and narrow at its front end and is supported low down or close to the ground, so that the operator may reach down and pick up the stalks of corn that may happen to be down below the knives. The machine includes a framing having side beams A and A', diverging toward their rear ends, where they are connected by the axle B', on which the wheels B for supporting the rear end of the implement are journaled. Between the front convergent ends of the side beams A and A', I secure the runner C, having a clevis C' or other suitable means for the connection of the draft. The platform D extends between and is supported on the beams A and A' about midway between their ends and slightly in advance of the wheels B and axle B' and has the front and rear beams E and E, extended from side to side, as shown in Fig. 1. To these beams E and E is hinged at F' the inner edge of the carrier F for the cutter G. This carrier F inclines correspondingly to the inclination of the side beam A', and the cutter G is rigidly secured to it so it will project from the outer edge of the carrier in position to operate upon the ground in the manner presently described. As shown, the cutter is formed with the outer wing or blade G' and the inner wing or blade G², the latter being in advance of the blade G² and at a greater angle to the direction of motion of the implement, as best shown in Fig. 1 of the drawings. It will also be noticed that the blades G' and G² are in the same plane, (see Fig. 2,) so that the cut of the blade G' will be in continuation of that of the blade G². By hinging the carrier F in connection with the body of the implement said carrier and the cutter may be turned from the position shown in Figs. 1 and 2 and in full lines, Fig. 3, to the position indicated in dotted lines, Fig. 3, and shown in full lines, Fig. 4, the blade being thus adjusted back out of the way to enable the implement to pass by the shock of corn without cutting the gallas-hill. When turned to position for use, as shown in Fig. 1, the hinged carrier is secured by suitable fastenings, that at the rear end consisting of a hook H, engaging in a groove or seat *h* in the carrier F, while the fastening at the front end of the carrier is shown as consisting of a hook I, engaging at *i* with a pin or other projection at the front end of the carrier. These fastenings can be readily released when it is desired to turn the cutter back out of the way, as shown in Fig. 4.

For holding the corn as it is cut I provide a standard J on the platform, near the front edge thereof, and also retaining-frames K and L, said frames K and L consisting of metallic rods secured at their ends, the frame K to the beam A' and the frame L transversely at the rear side of the platform B and formed with inclines K' and L'. The frame L and the standard J form a cradle for the cut corn as the same is laid across the platform, as will be understood from Fig. 3 of the drawings.

In operation the implement may be drawn by one horse and operated by one man standing on the platform and holding the corn to the cutter.

An extension-platform D' extends from the rear end of the platform D to the axle D', forming a continuation of the main platform and operating to support the ends of stalks resting upon the main platform in the use of the invention.

It will be noticed from Fig. 4 that the beams E are notched or rabbeted at e in the upper side of their outer ends to form seats for the carrier F when the latter is turned to the position shown in Figs. 1 and 3, the ends of the beams E forming rigid supports for the carrier F when the latter is in position for use.

The novel shape of the implement holds it to the center of the row of standing corn, and the implement being carried on wheels at the rear is light running, as most of the weight of the operator is borne on the wheels, the front end of the implement being supported by the runner, which makes it run steadily, and said runner also operates as a guide by following the furrow between the corn.

It will be noticed that the standard J inclines transversely across the platform opposite the front end of the cutter, that the frame K is arranged in advance of the standard J and of the cutter and extends approximately in the direction of the movement of the machine, inclining slightly to such direction, as shown, and that the retaining-frame L extends transversely the machine adjacent to the rear end of the cutter and is inclined generally in a reverse direction to the inclination of the standard J.

Having thus described my invention, what I claim as new, and desire to secure by Letters Patent, is—

1. The improved corn-cutter herein described comprising the frame having the side beams diverging rearwardly, the wheels supporting the rear end of said frame, the runner at the front end of the frame, the platform on the frame, the cutter having the front and rear blades arranged one in advance of the other the rear blade being at a greater angle to the direction of motion than the front one, the carrier for said cutter hinged at its inner edge to the body of the implement, fastenings for securing said carrier extended in position for use, the standard J inclining transversely across the platform opposite the front end of the cutter-carrier and the retaining-frame L extending transversely the machine adjacent to the rear end of the cutter and inclining in the reverse direction to the inclination of the standard J and coöperating with the standard in holding the corn when cut substantially as set forth.

2. The improved corn-cutter herein described comprising the frame having the diverging side beams, the platform, the cutter at one side of the platform, the carrier for said cutter movably connected with the frame, the standard J inclining transversely across the platform opposite the front end of the cutter, the frame K in advance of the standard J and extending approximately in the direction of movement of the machine, and the retaining-frame L extending transversely the machine adjacent to the rear end of the cutter and inclining in a direction the reverse of the inclination of the standard J substantially as set forth.

3. A corn-cutter comprising the framing, the cutter at one side thereof, the standard J inclining transversely across the machine in front of the cutter and the retaining-frame L extending reversely across the machine adjacent to the rear end of the cutter and inclining in a direction the reverse of the inclination of the standard J substantially as set forth.

THOMAS J. LOVE.

Witnesses:
  PAUL W. HOUSER,
  DONALD DANKEN.